United States Patent
Grob et al.

[19]

[11] Patent Number: 6,050,232
[45] Date of Patent: Apr. 18, 2000

[54] METHOD FOR STARTING AN INTERNAL COMBUSTION ENGINE IN A MOTOR VEHICLE

[75] Inventors: Ferdinand Grob, Besigheim; Dieter Volz, Heilbronn; Klaus Scherrbacher, Schwieberdingen, all of Germany

[73] Assignee: Robert Bosch GmbH, Stuttgart, Germany

[21] Appl. No.: 09/165,224

[22] Filed: Oct. 1, 1998

[30] Foreign Application Priority Data

Oct. 1, 1997 [DE] Germany .................. 197 43 492

[51] Int. Cl.[7] ............................................ F02M 17/00
[52] U.S. Cl. .............. 123/179.16; 123/295; 123/305
[58] Field of Search ................. 123/179.16, 295, 123/305

[56] References Cited

U.S. PATENT DOCUMENTS

| | | | |
|---|---|---|---|
| 5,231,962 | 8/1993 | Osuka et al. ............... | 123/179.16 |
| 5,749,334 | 5/1998 | Oda et al. ................... | 123/305 |
| 5,870,986 | 2/1999 | Ichinose ..................... | 123/179.16 |
| 5,937,822 | 8/1999 | Nkajima ..................... | 123/295 |
| 5,960,765 | 10/1999 | Iida et al. .................. | 123/295 |
| 5,970,950 | 10/1999 | Shimizu et al. ............ | 123/295 |

FOREIGN PATENT DOCUMENTS

| | | |
|---|---|---|
| 5801 48 223 | 11/1982 | Germany . |
| 42 00 606 A1 | 1/1992 | Germany . |
| 31 171 44 | 9/1986 | Japan . |

*Primary Examiner*—John Kwon
*Attorney, Agent, or Firm*—Kenyon & Kenyon

[57] ABSTRACT

A method is provided for starting an internal combustion engine for a motor vehicle, and an internal combustion engine is provided which employs such method. The internal combustion engine includes a piston which can move in a cylinder and can execute an intake stroke, a compression stroke, a power stroke and an exhaust stroke. In addition, a control unit is provided with which fuel can be injected directly into a combustion chamber, which is delimited by the cylinder and the piston either during a compression stroke in a first operating mode or during an intake stroke in a second operating mode. The control unit is designed so that for starting, fuel can be injected in a first injection directly into the combustion chamber whose respective piston is in the power stroke.

18 Claims, 5 Drawing Sheets

METHOD FOR STARTING AN INTERNAL COMBUSTION ENGINE IN A MOTOR VEHICLE

FIELD OF THE INVENTION

The present invention relates to a method for starting an internal combustion engine in a motor vehicle, where the internal combustion engine has a piston which can move in a cylinder and can execute an intake stroke, a compression stroke, a power stroke and an exhaust stroke, and where the fuel can be injected directly into a combustion chamber delimited by the cylinder and the piston either during a compression stroke in a first operating mode or during an intake stroke in a second operating mode. In addition, the present invention relates to an internal combustion engine for a motor vehicle, having a piston which can move in a cylinder and can execute an intake stroke, a compression stroke, a power stroke and an exhaust stroke, and having a control unit with which the fuel can be injected directly into a combustion chamber delimited by the cylinder and the piston either during a compression stroke in a first operating mode or during an intake stroke in a second operating mode.

BACKGROUND INFORMATION

Internal combustion engines with a direct injection of fuel into the combustion chamber are generally known. A distinction is made between stratified charge or stratified operation as the first operating mode and homogeneous operation as the second operating mode. Stratified operation is used in particular at lower loads, while homogeneous operation is used at higher loads on the internal combustion engine. In stratified operation, fuel is injected into the combustion chamber, i.e., in the immediate vicinity of a spark plug, during the compression stroke. Therefore, there cannot be a uniform distribution of fuel in the combustion chamber. The advantage of stratified operation is that with a very small amount of fuel, lower loads can be handled by the internal combustion engine. However, greater loads cannot be handled by stratified operation. In homogeneous operation intended for such higher loads, fuel is injected during the intake stroke of the internal combustion engine, so that fuel is swirled and thus easily distributed in the combustion chamber. To this extent, homogeneous operation corresponds approximately to an internal combustion engine operating mode where fuel is injected into the intake pipe in the traditional manner.

In both operating modes, i.e., in stratified operation and in homogeneous operation, the amount of fuel to be injected is controlled and/or regulated at an optimized level with regard to fuel injection, a reduction of emissions and the like by a control unit as a function of a plurality of parameters.

For starting such a conventional internal combustion engine with direct injection, it is known that an electric starter motor can be used to start the internal combustion engine, and then, after approximately one or two revolutions of the engine, fuel is injected into the combustion chambers and ignited according to the second operating mode, i.e., according to a homogeneous operation. With regard to starting-and-stopping operation of an internal combustion engine, e.g., when stopping at red lights and starting up again, the starting procedure described above is associated with unacceptably high fuel and electric power consumption.

An object of the present invention is to provide a method for starting an internal combustion engine with a lowest possible amount of electric power and/or fuel.

SUMMARY OF THE INVENTION

With a method and an internal combustion engine according to the present invention, this object is achieved by injecting fuel in a first injection directly into the combustion chamber whose piston is in the power stroke.

As a result, an ignition of fuel in the combustion chamber can take place with the very first engine revolution. It is essential here for the first injection to take place in the combustion chamber whose piston is in the power stroke. As a result, the internal combustion engine is started immediately in the proper operating mode. This then results in the internal combustion engine being driven by its own power in the first revolution. It is thus possible to do without a starter at all. Fuel injected into the combustion chamber with the first injection is sufficient to start the internal combustion engine moving and accelerate it to idling speed. This has an important advantage of making it possible to eliminate the starter as such as well as the electric power consumed by it.

It is also possible to provide a starter, but it may be designed to operate at a lower power level than before, so it consumes less electricity. In addition, the starter may be turned off relatively soon after the first injection, because the internal combustion engine accelerates to idling speed much more rapidly than previously due to the combustion beginning then. This also permits additional electric power savings.

In one embodiment of the present invention, while the engine is stopped, the fuel is injected in a first injection directly into the internal combustion chamber whose piston is in the power stroke. This is necessary if the starter is to be eliminated. In this case, the first injection takes place while the engine is at a standstill. Due to the resulting combustion, the engine is set in motion, so that it can then be accelerated to idling speed with the help of additional injection and additional combustion. As mentioned above, no starter is required in this case.

In another embodiment of the present invention, after the piston has executed approximately one to three cycles, preferably after the piston has executed approximately two cycles, fuel is injected with the first injection directly into the combustion chamber whose piston is in the power stroke. The internal combustion engine must be set in motion by a starter in the first two cycles mentioned above. Then combustion begins with the first injection and the engine is accelerated by its own power. Because of this combustion, the starter may be designed to operate at a lower power level than was previously the case, as already explained above.

In another embodiment of the present invention, the fuel is metered according to the first operating mode in the first injection. Consequently, fuel can be saved because of the first operating mode, i.e., because of the stratified operation in comparison with the previous starting in homogeneous operation.

In another embodiment of the present invention, the fuel injected into the combustion chamber with the first injection is ignited in the power stroke. On the whole, an initial injection and the respective ignition thus take place in the power stroke. As a result, the engine is set in motion and accelerated by the resulting combustion.

In another embodiment of the present invention, after the first injection, the fuel is injected again in a second injection directly into the combustion chamber whose piston is in the power stroke, with the fuel being metered according to the first operating mode, and the fuel of the second injection, injected into the combustion chamber, is ignited in the power stroke. The first injection is thus repeated. This yields the advantages explained above, in particular electric power and fuel savings or, in the extreme case, elimination of the starter as such.

In another embodiment of the present invention, the internal combustion engine is operated in the second operating mode after the first injection or after the second injection. In this way, by injecting more fuel in homogeneous operation, the internal combustion engine can be accelerated to idling speed even more rapidly.

In another embodiment of the present invention, after the piston has executed additional strokes, the internal combustion engine switches from the second operating mode to the first operating mode. Thus, the higher fuel consumption associated with the second operating mode is minimized by switching as soon as possible back to the first operating mode, i.e., the fuel-saving stratified operation.

It is also advantageous if the switch takes place as a function of an engine rpm and/or a rail pressure. This ensures that the internal combustion engine will be accelerated adequately while not having to remain too long in homogeneous operation.

In another embodiment of the present invention, an engine operation is continued in the first operating mode after the first injection and/or after the second injection. In this case, the internal combustion engine is not operated temporarily in homogeneous operation, i.e., in the second operating mode, but instead injections are continued according to the first operating mode, i.e., in a stratified operation. Additional fuel savings can be achieved in this manner.

Another embodiment of the method according to the present invention is provided in an electric storage medium for a control unit of an internal combustion engine in a motor vehicle. A program which can be run on a computer, in particular a microprocessor, and is suitable for executing the method according to the present invention is stored on the electric storage medium. Thus, in this case, the present invention is implemented by a program stored on an electric storage medium, so this together with the storage medium provided with the program constitutes the present invention, as does the method executed with this program.

DETAILED DESCRIPTION

Figure 1:
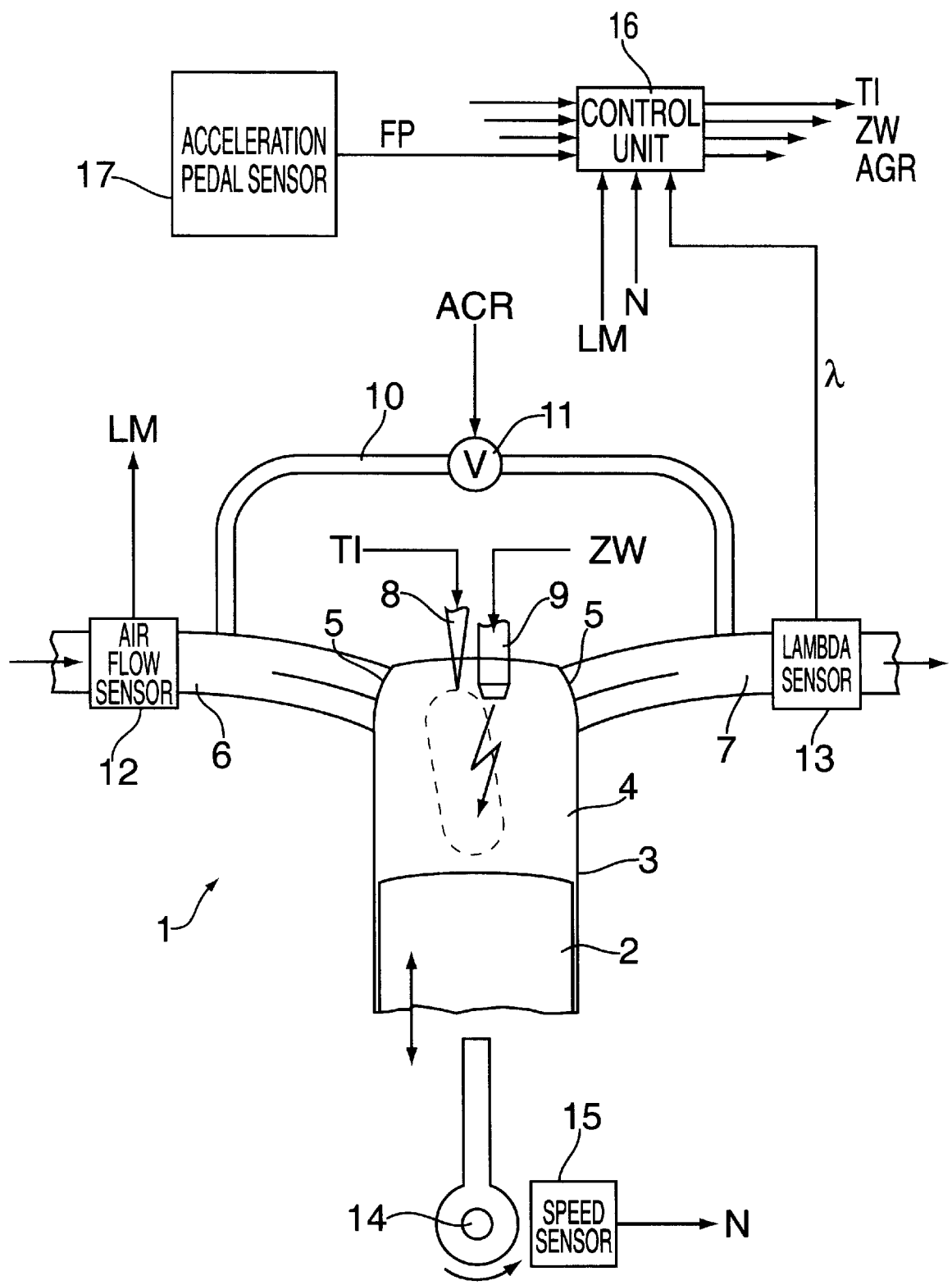
FIG. 1 shows a schematic block diagram of a first embodiment of an internal combustion engine according to the present invention in a motor vehicle.

FIG. 1 shows an internal combustion engine 1, where a piston 2 can move back and forth in a cylinder 3. Cylinder 3 has a combustion chamber 4 connected to an intake pipe 6 and an exhaust pipe 7 by valves 5. In addition, an injection valve 8 that can be driven by a signal TI and a spark plug 9 that can be driven by a signal ZW are provided for combustion chamber 4. Exhaust pipe 7 is connected to intake pipe 6 by exhaust gas recirculation line 10 and exhaust gas recirculation valve 11, which can be driven by a signal AGR.

Intake pipe 6 is provided with an air flow sensor 12, and exhaust pipe 7 is provided with a lambda sensor 13. Air flow sensor 12 measures the oxygen content of fresh air supplied to intake pipe 6 and generates a signal LM according to the results. Lambda sensor 13 measures the oxygen content of the exhaust gas in exhaust pipe 7, generating a signal A depending on the results.

In a first operating mode, stratified operation of internal combustion engine 1, fuel is injected by injection valve 8 into combustion chamber 4 locally in the immediate vicinity of spark plug 9 during a compression stroke executed by piston 2, and immediately before top dead center of piston 2 or before the firing point. Then fuel is ignited with the help of spark plug 9, driving piston 2 by expansion of the fuel ignited in the subsequent power stroke.

In a second operating mode, i.e., homogeneous operation of internal combustion engine 1, fuel is injected into combustion chamber 4 by injection valve 8 during an intake stroke executed by piston 2. Turbulence is created in the injected fuel due to the simultaneous intake of air, thus distributing fuel essentially uniformly in combustion chamber 4. Then the fuel-air mixture is compressed during the compression stroke and next ignited by spark plug 9. Piston 2 is driven by the expansion of ignited fuel.

In stratified operation as well as homogeneous operation, a crankshaft 14 is set in rotation by the driven piston, ultimately driving the wheels of the motor vehicle. Crankshaft 14 has a speed sensor 15 to generate a signal N as a function of the rotation of crankshaft 14.

In stratified operation and homogeneous operation, fuel is injected under high pressure into combustion chamber 4 through injection valve 8. For this purpose, an electric fuel pump and a high-pressure pump are provided, the latter driven by internal combustion engine 1 or an electric motor. The electric fuel pump produces a rail pressure EKP of at least 3 bar, and the high-pressure pump produces a rail pressure HD up to about 100 bar.

The amount of fuel injected by injection valve 8 into combustion chamber 4 in stratified operation and homogeneous operation is controlled and/or regulated by a control unit 16 with regard to low fuel consumption and/or low pollutant emission in particular. For this purpose, control unit 16 has a microprocessor with a program suitable for performing the above-described control and/or regulation stored in a storage medium (e.g., a read-only memory device).

Control unit 16 receives input signals representing engine performance quantities measured by sensors. For example, control unit 16 is connected to air flow sensor 12, lambda sensor 13 and speed sensor 15. In addition, control unit 16 is connected to an accelerator pedal sensor 17, which generates a signal FP indicating the position of a driver-operated accelerator pedal. Control unit 16 generates output signals with which engine performance can be influenced via actuators in accordance with the desired control and/or regulation. For example, control unit 16 is connected to injection valve 8, spark plug 9 and exhaust gas recirculation valve 11 and generates signals TI, ZW and AGR required for driving them.

FIGS. 2 through 5 illustrate, in a diagram form of four different methods of starting internal combustion engine 1 shown in FIG. 1. Each individual row in each diagram refers to a different cylinder 3 as indicated. Each different cylinder 3 is identified with a number. The individual columns of the diagrams refer to the individual cycles or strokes of piston 2 of respective cylinder 3. Each piston 2 may be in an intake stroke, a compression stroke, a power stroke or an exhaust stroke. The transitions between the individual strokes are characterized by top dead center OT of piston 2. To this extent, the axis along the strokes of piston 2 forms an angle of rotation ° KW of crankshaft 14. The position of internal combustion engine 1 before starting is shown with a dotted line, i.e., the position when internal combustion engine 1 is at a standstill.

Figure 2:
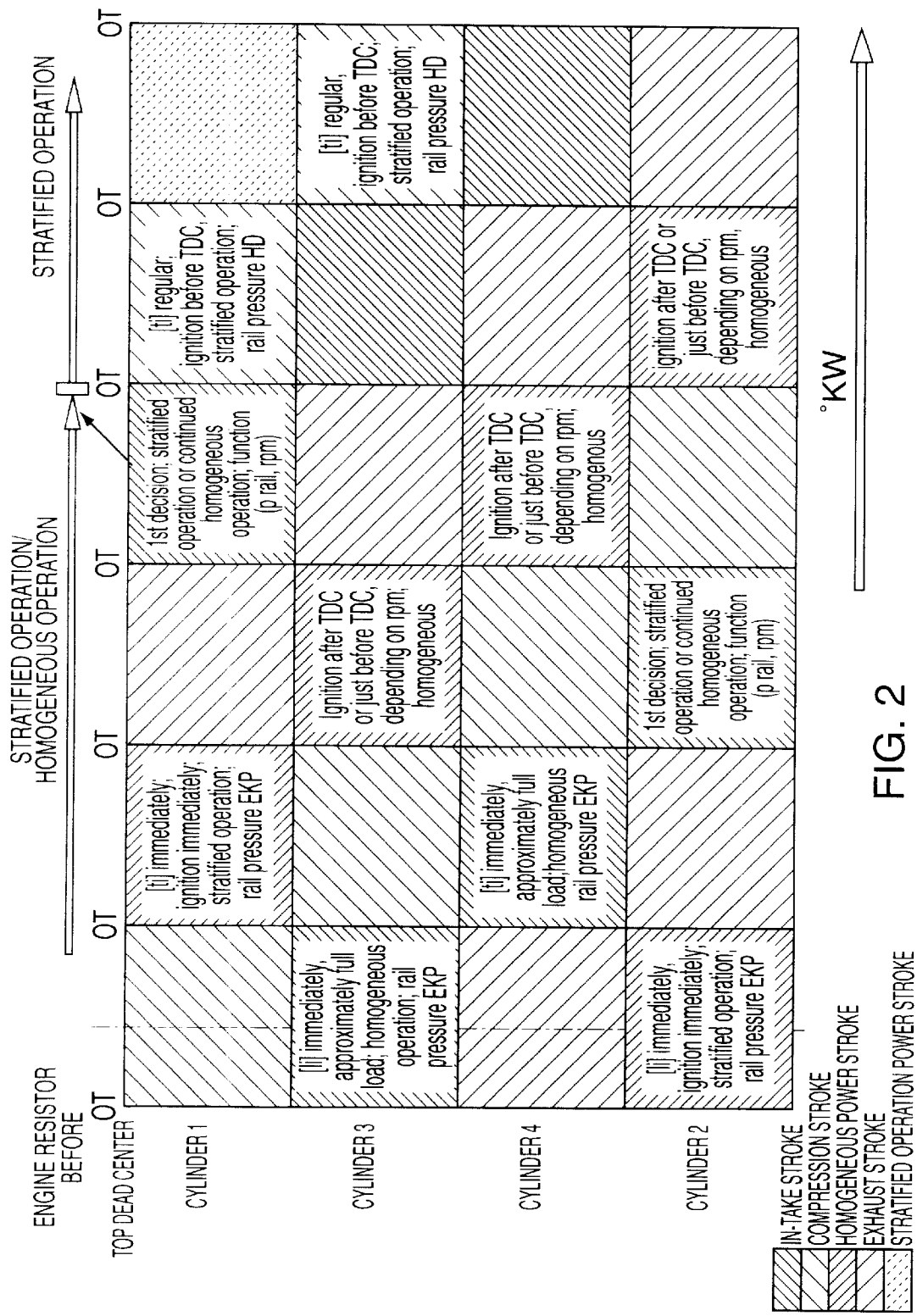
FIG. 2 shows a schematic diagram of a first embodiment of a method according to the present invention for starting the combustion engine illustrated in FIG. 1.

In the method shown in FIG. 2, speed sensor 15 is designed as an absolute phase angle sensor. This means that speed sensor 15 generates angle of rotation ° KW signal at all times (in particular after the engine has been at a standstill) and relays it to control unit 16.

Furthermore, in the method shown in FIG. 2, it is assumed that the highpressure pump is driven by internal combustion engine 1, and the throttle valve of internal combustion engine 1 is open during starting. No starter is necessary in the method shown in FIG. 2.

As shown in FIG. 2, fuel is injected into cylinder no. 2, which is in its power stroke, in the position of internal combustion engine 1 indicated with a dotted line, i.e., when internal combustion engine 1 is at a standstill. Fuel is thus metered in accordance with stratified operation. Since internal combustion engine 1 is at a standstill, the high-pressure pump doe, not yet generate any pressure, so the only pressure is rail pressure EKP of the electric fuel pump.

With this pressure, fuel is injected into cylinder no. 2 in the power stroke. This constitutes a first injection. Then the injected fuel is likewise ignited in the power stroke of cylinder no. 2. This results in a first combustion, due to which a rotational motion is induced in crankshaft 14.

In a subsequent second injection, fuel is injected into cylinder no. 1. Fuel is injected at rail pressure EKP of the electric fuel pump because the high-pressure pump has little or no pressure. Fuel is metered according to stratified operation. It is assumed here that the compression pressure of the cylinder is still so low that fuel can be injected at rail pressure EKP in stratified operation. Fuel is then ignited and a second combustion occurs, causing crankshaft 14 of internal combustion engine 1 to turn further.

A subsequent third injection into cylinder no. 3 takes place according to homogeneous operation. It is assumed here that the compression pressure is now so high that rail pressure EKP would no longer be sufficient. For this reason, fuel is injected into cylinder no. 3 simultaneously with the first injection, i.e., while internal combustion engine 1 is at a standstill. This is the intake stroke of cylinder no. 3. Fuel is metered according to a full load VL of homogeneous operation and injected with rail pressure EKP of the electric fuel pump. The injected fuel can then be distributed in respective combustion chamber 4 during the compression stroke of cylinder no. 3 simultaneously with the second injection. Then in the power stroke of cylinder no. 3, the fuel/air mixture now present is ignited either just before or just after top dead center OT of respective piston 2 as a function of rpm N of internal combustion engine 1.

In a subsequent fourth injection and optionally a fifth injection, the method described above is repeated for cylinder no. 4 and cylinder no. 1 (or cylinder no. 2).

Rail pressure HD generated by the high-pressure pump and rpm N of internal combustion engine 1 are checked before each injection. If rail pressure HD and/or rpm N is sufficient for the transition to stratified operation, the subsequent injections are carried out according to stratified operation.

This means that, as shown for cylinder no. 1 as an example, fuel is injected at rail pressure HD into respective combustion chamber 4 in the compression stroke of cylinder no. 1 according to stratified operation and is ignited just before the top dead center of respective piston 2. This stratified operation is then continued by cylinder no. 3 shown in FIG. 2. Thus, the engine switches from homogeneous operation to stratified operation approximately after the fourth or fifth injection.

Figure 3:
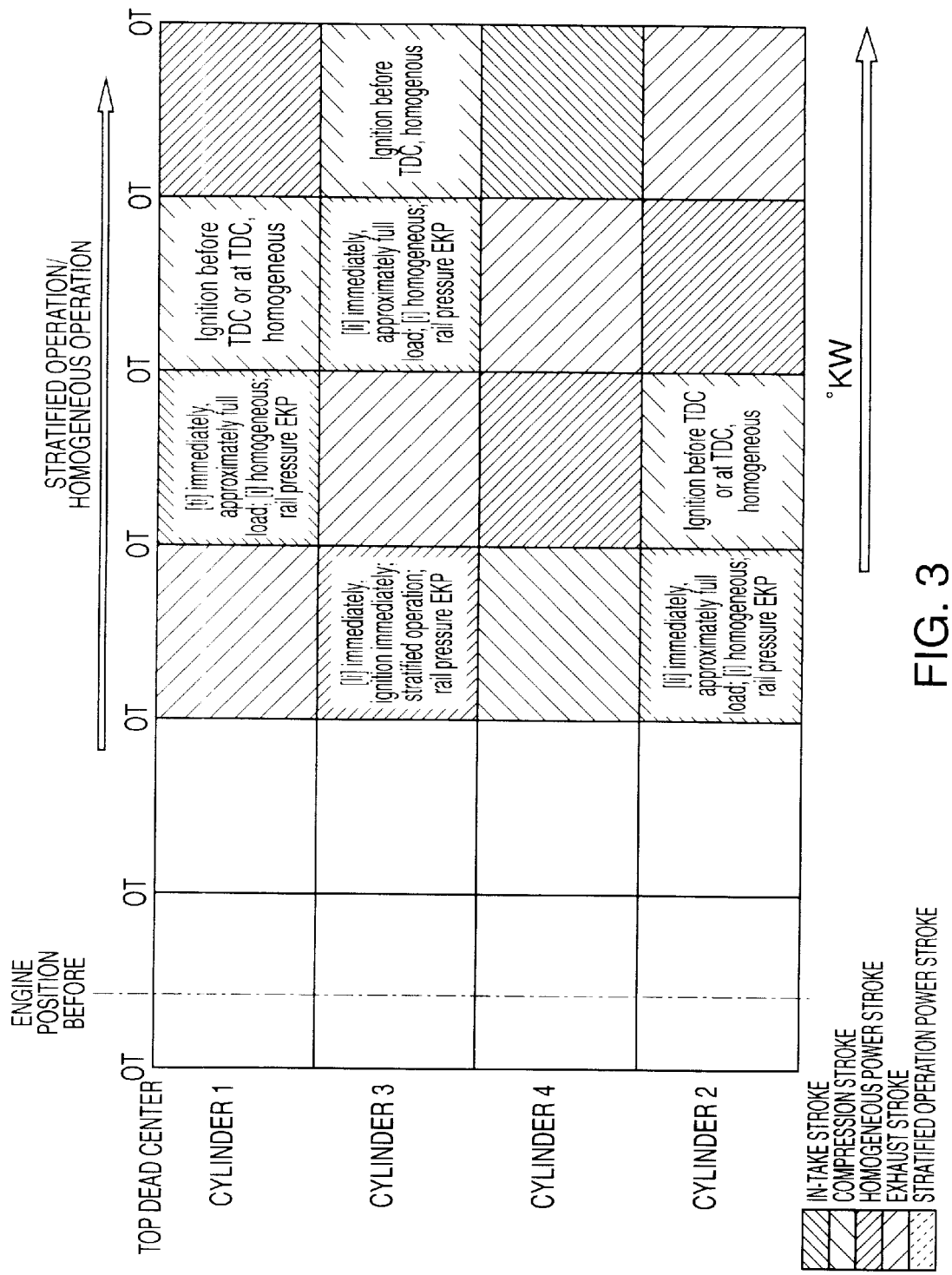
FIG. 3 shows a schematic diagram of a second embodiment of the method according to the present invention for starting the internal combustion engine shown in FIG. 1.

In the method shown in FIG. 3, speed sensor 15 is not designed as an absolute phase-angle sensor. This means that speed sensor 15 generates angle of rotation ° KW signal and relays it to control unit 16 only after a certain revolution from standstill of internal combustion engine 1.

In addition, in the method shown in FIG. 3, it is assumed that the highpressure pump is driven by internal combustion engine 1, and that the throttle valve of internal combustion engine 1 is open during starting.

Internal combustion engine 1 is turned forward by a starter approximately one revolution from standstill. This corresponds to the first two strokes shown in FIG. 3. Thus, speed sensor 15 is capable of indicating angle of rotation ° KW of crankshaft 14.

Next, fuel is injected into cylinder no. 3, which is then in its power stroke. Fuel is metered at rail pressure EKP of the electric fuel pump according to stratified operation. This constitutes the first injection in the method shown in FIG. 3. Then fuel is ignited in the power stroke of cylinder no. 3, and internal combustion engine 1 continues to move forward because of the first combustion then taking place.

During the first injection, cylinder no. 4 executes its compression stroke. Since the high-pressure pump is not yet producing enough pressure, the pressure prevailing due to the compression in cylinder no. 4 is higher than rail pressure EKP produced by the electric fuel pump. For this reason, there is no injection into cylinder no. 4.

Simultaneously with the first combustion, fuel is also injected into cylinder no. 2. This is the intake stroke of cylinder no. 2. Fuel is metered according to full load VL in homogeneous operation at rail pressure EKP produced by the electric fuel pump. Fuel is ignited either just before or just after top dead center OT of respective piston 2 in the subsequent compression stroke of cylinder no. 2, depending on rpm N of internal combustion engine 1. This is the second combustion in the present method.

Simultaneously with the second combustion, the method described above is repeated with cylinder no. 1. This is followed by a repetition for cylinder no. 3 and so forth. These repeated injections in homogeneous operation are continued until reaching a sufficient rail pressure HD of the high-pressure pump and/or rpm N of internal combustion engine 1. Then the engine switches from homogeneous operation to stratified operation. This switching corresponds to that already described in conjunction with FIG. 2.

Figure 4:
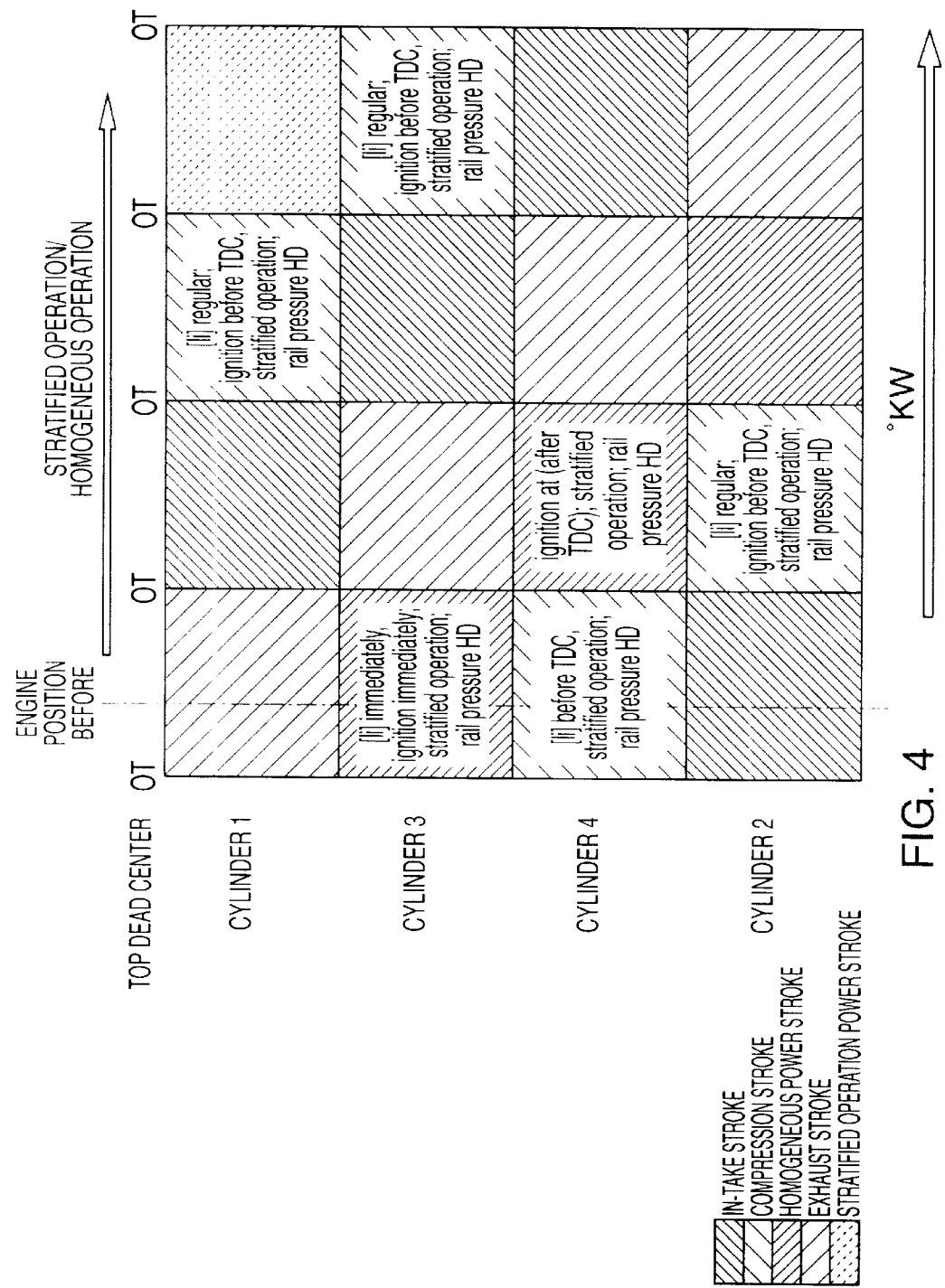
FIG. 4 shows a schematic diagram of a third embodiment of the method according to the present invention for starting the internal combustion engine shown in FIG. 1.

In the method shown in FIG. 4, speed sensor 15 is designed as an absolute phase-angle sensor. This means that speed sensor 15 generates angle of rotation ° KW signal at all times, in particular after the internal combustion engine has been at a standstill, and relays it to control unit 16.

In addition, with the method according to FIG. 4, it is assumed that the high-pressure pump is driven by an electric motor and that the throttle valve of internal combustion engine 1 is open during starting. No starter is necessary in the method shown in FIG. 4.

As shown in FIG. 4, fuel is injected into cylinder no. 3, which is in the position of internal combustion engine 1 indicated with a broken line, i.e., with internal combustion engine 1 at a standstill, in its power stroke. Fuel is then metered according to stratified operation. Since an electric high-pressure pump is provided, it generates rail pressure HD, even when internal combustion engine 1 is at a standstill, which is sufficient for stratified operation. Fuel is injected into cylinder no. 3 in the power stroke at this rail pressure HD. This is a first injection. Then, the injected fuel is also ignited in the power stroke of cylinder no. 3. This results in a first combustion, causing a rotational movement of crankshaft 14.

Approximately at the same time as the first injection or before top dead center, where cylinder no. 4 is in its compression stroke, fuel is injected into cylinder no. 4. Fuel is metered at rail pressure HD of the high-pressure pump according to stratified operation. For the following power stroke of cylinder no. 4, injected fuel is ignited just before or just after top dead center of respective piston 2, depending on rpm N of the internal combustion engine. This is a second combustion.

Simultaneously with the second combustion and thus in the compression stroke of cylinder no. 2, fuel is injected into cylinder no. 2. This takes place at rail pressure HD according to stratified operation. Fuel is also ignited in the compression stroke of cylinder no. 2. This is possible because rpm N is already high enough. This is another combustion according to: stratified operation.

Then fuel is injected consecutively into cylinders no. 1, no. 3, etc., and ignited according to stratified operation, so that internal combustion engine 1 is accelerated to idling speed.

Figure 5:
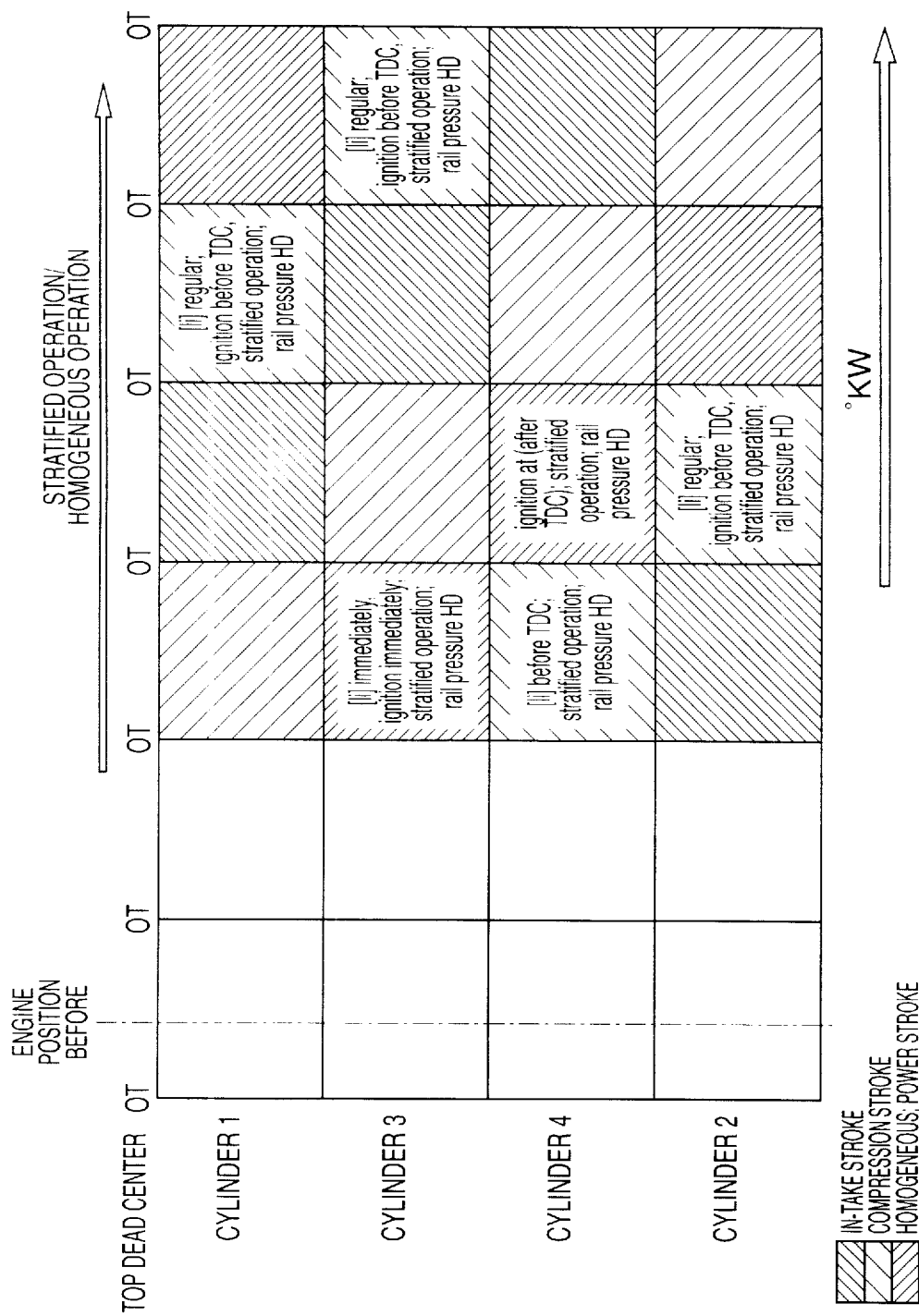
FIG. 5 shows a schematic diagram of a fourth embodiment of the method according to the present invention for starting the internal combustion engine shown in FIG. 1.

In the method shown in FIG. 5, speed sensor 15 is not designed as an absolute phase-angle sensor. This means that speed sensor 15 generates angle of rotation ° KW signal only after a certain revolution after internal combustion engine 1 has been at a standstill and relays it to control unit 16.

In addition, in the method shown in FIG. 5, it is assumed that the high-pressure pump is driven either by an electric motor or by internal combustion engine 1, and that the high-pressure pump generates required rail pressure HD after approximately one revolution of the internal combustion engine. The throttle valve of internal combustion engine 1 is open during starting.

Internal combustion engine 1 is rotated forward by a starter from a standstill by approximately one revolution. This corresponds to the first two strokes shown in FIG. 3. Thus, speed sensor 15 is capable of indicating angle of rotation ° KW of crankshaft 14.

Then fuel is injected into cylinder no. 3, which is now in its power stroke. Fuel is metered here at rail pressure HD of the high-pressure pump according to stratified operation. This is the first injection in the method illustrated in FIG. 3. Then it is ignited in the power stroke of cylinder no. 3 and internal combustion engine 1 moves farther forward because of the first combustion then taking place.

Fuel is injected into cylinder no. 4 approximately simultaneously with the first injection or before the top dead center, where cylinder no. 4 is in its compression stroke. Fuel is metered at rail pressure HD of the high-pressure pump according to stratified operation. For the subsequent power stroke of cylinder no. 4, the injected fuel is ignited just before or just after top dead center of the respective piston 2, depending on rpm N of the internal combustion engine. This is a second combustion.

Fuel is injected into cylinder no. 2 simultaneously with the second combustion and thus in the compression stroke of cylinder no. 2. This takes place at rail pressure HD according to stratified operation. Fuel is also ignited in the compression stroke of cylinder no. 2. This is another combustion according to stratified operation.

Then fuel is injected successively into cylinders no. 1, no. 3, etc. and ignited according to stratified operation, so that internal combustion engine 1 accelerates to idling speed.

What is claimed is:

1. A method for starting an internal combustion engine, the internal combustion engine including a cylinder and a piston movable in the cylinder, the cylinder and the piston defining a combustion chamber, the method comprising the steps of:

(a) executing an intake stroke, a compression stroke, a power stroke and an exhaust stroke with the piston;

(b) during a first injection, injecting fuel directly into the combustion chamber during the power stroke;

(c) after step (b), injecting the fuel directly into the combustion chamber at least one of i) during the compression stroke in a first operating mode, and ii) during the intake stroke in a second operating mode; and (d) metering the fuel in the first operating mode during the first injection.

2. The method according to claim 1, wherein, during the first injection, the internal combustion engine is in a standstill position.

3. The method according to claim 1, wherein step (b) is performed after the piston executes approximately one to three strokes.

4. The method according to claim 1, wherein step (b) is performed after the piston executes approximately two strokes.

5. The method according to claim 1, wherein, with the first injection, the fuel injected into the combustion chamber is ignited in the power stroke.

6. The method according to claim 1, further comprising the steps of:

(e) after the first injection and during a second injection, further injecting the fuel directly into the combustion chamber during the power stroke; and (f) after step (e), further metering the fuel in the first operating mode; and (g) after step (e), igniting the fuel injected into the combustion chamber in the second injection during the power stroke.

7. The method according to claim 6, further comprising the step of:

(h) after one of the first injection and the second injection, operating the internal combustion engine in the second operating mode.

8. The method according to claim 7, further comprising the step of:

(i) after the piston executes additional strokes, switching the internal combustion engine from the second operating mode to the first operating mode.

9. The method according to claim 8, wherein the internal combustion engine is switched from the second operating mode to the first operating mode as a function of at least one of a revolutions-per-minute value of the internal combustion engine and a rail pressure value.

10. The method according to claim 6, further comprising the step of:
(j) further operating the internal combustion engine in the first operating mode after at least one of the first injection and the second injection.

11. The method according to claim 8, wherein the internal combustion engine is situated in a motor vehicle.

12. An internal combustion engine, comprising:
a cylinder;
a piston moving in the cylinder and executing an intake stroke, a compression stroke, a power stroke and an exhaust stroke, the piston and the cylinder defining a combustion chamber; and
a control unit:
controlling fuel to be injected directly into the combustion chamber during the power stroke in a first injection, controlling fuel to be injected directly into the combustion chamber at least one of i) during a compression stroke in a first operating mode, and ii) during an intake stroke in a second operating mode, and
metering the fuel in the first operating mode in the first injection.

13. The internal combustion engine according to claim 12, wherein the first injection is performed when the internal combustion engine is in a standstill position.

14. The internal combustion engine according to claim 12, wherein the internal combustion engine lacks a starter.

15. The internal combustion engine according to claim 12, wherein the first injection is performed after the piston executes approximately one to three strokes.

16. The internal combustion engine according to claim 12, wherein the first injection is performed after the piston executes approximately two strokes.

17. The internal combustion engine according to claim 12, further comprising:
a starter associated with the control unit and operating at a lower power level.

18. The internal combustion engine according to claim 12, wherein the internal combustion engine is situated in a motor vehicle.

* * * * *